United States Patent [19]

Yokoyama et al.

[11] 4,417,280

[45] Nov. 22, 1983

[54] SERVO AMPLIFIER FOR TELEVISION CAMERA LENS

[75] Inventors: Tsuneo Yokoyama; Kazumichi Tsuchiya, both of Omiya, Japan

[73] Assignee: Fuji Photo Optical Co., Ltd., Saitama, Japan

[21] Appl. No.: 352,529

[22] Filed: Feb. 26, 1982

Related U.S. Application Data

[63] Continuation-in-part of Ser. No. 150,433, May 16, 1980, abandoned, which is a continuation of Ser. No. 924,085, Jul. 12, 1978, abandoned.

[51] Int. Cl.³ ............................................. H04N 5/26
[52] U.S. Cl. ....................................... 358/227; 358/228
[58] Field of Search ............... 358/227, 228; 318/635, 318/677, 434; 307/237, 318

[56] References Cited

U.S. PATENT DOCUMENTS

| | | | |
|---|---|---|---|
| 3,079,851 | 3/1963 | Back | 358/228 |
| 3,102,163 | 8/1963 | Sennhenn | 358/228 |
| 3,201,675 | 8/1965 | Curran et al. | 318/635 |
| 3,206,663 | 9/1965 | Neal et al. | 318/635 |
| 3,251,951 | 5/1966 | Meewezen | 307/318 |
| 3,327,197 | 6/1967 | Marquis | 318/434 |
| 3,387,205 | 6/1968 | Tesdall | 318/434 |
| 3,495,037 | 2/1970 | Hitz | 358/228 |
| 3,526,819 | 9/1970 | Graf | 318/434 |
| 3,541,941 | 11/1970 | Oadby et al. | 358/227 |
| 3,558,927 | 1/1971 | Whitehouse | 307/237 |
| 3,621,136 | 11/1971 | Stanwood | 358/227 |
| 3,649,897 | 3/1972 | Messick | 318/434 |
| 3,660,682 | 5/1972 | Gartner | 307/237 |
| 3,758,838 | 9/1973 | Wright | 318/635 |
| 3,846,811 | 11/1974 | Nakamura et al. | 354/145 |
| 3,950,687 | 4/1976 | Watson, Jr. | 318/635 |
| 4,125,800 | 11/1978 | Jones | 318/677 |

FOREIGN PATENT DOCUMENTS 1503948 10/1967 France ............................... 307/237

*Primary Examiner*—Richard Murray
*Attorney, Agent, or Firm*—Pasquale A. Razzano

[57] ABSTRACT

A servo amplifier for a television camera lens for driving a servomotor to control a zooming, focusing and/or iris control is connected with a power source by way of a current limiter to prevent a voltage drop caused by a rush current. The servo amplifier is composed of a pre-amplifier and a power amplifier, in which the power amplifier is supplied with a power by way of the current limiter. The current limiter is composed of a transistor, a zener diode and resistors, and operates to limit the level of the electric current flowing therethrough.

2 Claims, 7 Drawing Figures

SERVO AMPLIFIER FOR TELEVISION CAMERA LENS

CROSS-REFERENCE TO RELATED APPLICATIONS

This is a continuation-in-part application of the United States Patent Application Ser. No. 150,433 filed May 16, 1980, which is a continuation of U.S. Ser. No. 924,085, filed July 12, 1978 (now abandoned).

BACKGROUND OF THE INVENTION

1. Field of the Invention

This invention relates to a servo amplifier for a television camera lens, and more particularly to an electric circuit for controlling a servo-mechanism in a television camera lens for operating an automatic iris control mechanism, a zooming mechanism and a focusing mechanism. The present invention is particularly concerned with an improvement in the circuit for preventing a voltage drop in the circuit caused by an abnormal current flow occurring at the time of starting of a servomotor and the like.

2. Description of the Prior Art

In the conventional television camera which is used in a television studio equipped with a large power source equipment or outdoor with a power source car, it is possible to use a power source having a great capacity. Therefore, there is no fear of voltage drop when the servomotor is started or the rotation of the servomotor is inverted which causes a rush current to flow through the circuit of the camera.

In a handy type camera, however, which is compact in size and usually used without a large power source, the voltage drop caused by the rush current when the servomotor is started or the direction of rotation of the motor is inverted is of a significant problem. The rush current is a very abnormal current which suddenly rises up to five to six times as high as the normal current. By this suddenly flowing current, the source voltage of the battery or the terminal voltage of the constant voltage power source of the circuit is markedly lowered, which affects the operation of the video circuit or servomotor control circuit in the camera.

SUMMARY OF THE INVENTION

In view of the above described problem, it is the primary object of the present invention to provide a servo amplifier for a television camera which prevents the voltage drop of the circuit caused by the rush current of the servomotor control circuit.

In more detail, the object of the present invention is to provide a means for controlling or limiting current in a servomotor control circuit in a television camera so that the voltage drop of the power is limited to such an extent that the operation of the video circuit or the servomotor control circuit is not affected by the limited voltage drop.

In accordance with the present invention, a current limiter is provided at the power supply output of the servo amplifier for a television camera so that a current of the level higher than a predetermined level may not be supplied to the servomotor by the power source and the voltage drop may be prevented. The current limiter includes a transistor and a zener diode and allows a current flow of the level below a predetermined level but does not allow a current flow of the level above the predetermined level.

DESCRIPTION OF THE PREFERRED EMBODIMENTS

Figure 1:
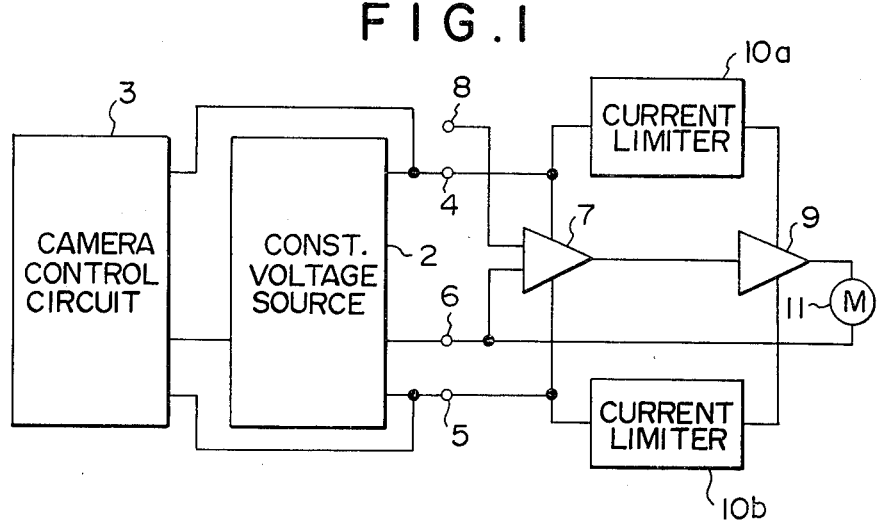
FIG. 1 is a circuit view of a servo amplifier for a television camera in accordance with an embodiment of the present invention.

Now preferred embodiments of the present invention will be described in detail with reference to FIGS. 1 and 2. Referring to FIG. 1, a camera control circuit 3 such as a video signal circuit is connected with a constant voltage source 2. The constant voltage source 2 has a positive terminal 4 and a negative terminal 5 to which source terminals of a pre-amplifier 7 are connected. Power terminals of a power amplifier 9 are connected with the positive terminal 4 and the negative terminal 5 of the constant voltage source 2 by way of current limiters 10a and 10b, respectively. One of the input terminals of the pre-amplifier 7 is connected with a common terminal 6 of the constant voltage source 2 and the other input terminal is connected with a control signal input terminal 8. The control signal input terminal 8 is supplied with a control signal for an automatic iris mechanism or a focusing mechanism of a television camera not shown. The pre-amplifier 7 has a function to compare the control signal with a feed-back signal from a controlled means such as zooming, focusing and iris controlling means and with a standard voltage. The output of the pre-amplifier 7 is input into the power amplifier 9 as it is, and the output of the power amplifier 9 is input into an end of a servomotor 11 the other end of which is connected with a common terminal 6 of the constant voltage source 2.

Among the above described elements of the circuit, the constant voltage source 2 and the camera control circuit 3 are within the television camera body and the other elements including the pre-amplifier 7 are located within a television lens or mounted thereto.

Figure 2:
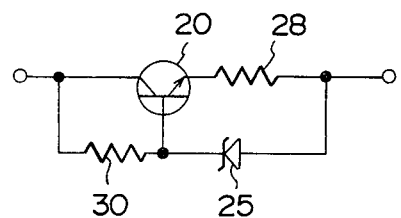
FIG. 2 is a circuit view showing a current limiter used in the circuit of the present invention.

FIG. 2 shows a current limiter 10 used in the circuit shown in FIG. 1. A transistor 20 is connected between the constant voltage source 2 and a load 12 corresponding to the power amplifier 9 and a servomotor 11. An emitter resistor 28 is connected with the emitter of the transistor 20 and the load 12. A bias resistor 30 is connected between the base (connecting point P of the resistor 30 and the base of the transistor 20) and the collector of the transistor 20. Further, a zener diode 25 is connected between the base of the transistor 20 and the connecting point Q of the emitter resistor 28 and the load 12.

The transistor 20 is supplied with a base current $I_B$ through the resistor 30 and turned on thereby. Thus, a load current $I_C$ flows through the transistor 20. The load current $I_C$ is changed by the impedance of the load 12. The amount of the current $I_B$ flowing through the resistor 30 is much smaller than (e.g. about 1/1000 of) that of the load current $I_C$, and accordingly can be neglected. The zener diode 25 hardly flows a current when the voltage thereacross is not more than the predetermined zener voltage. When the voltage across the zener diode goes up to the zener voltage, a current flows through the zener diode and the zener diode functions to prevent the voltage thereacross from going further up higher than the zener voltage.

The voltage across the zener diode 25 is a sum of the voltage drop caused by the current $I_C$ flowing through the emitter resistor 28 and the base-emitter voltage $V_{BE}$ of the transistor 20. Since the $V_{BE}$ is substantially constant, the variation of the voltage $V_{PQ}$ across the zener diode 25 depends upon the load current $I_C$. This is represented by the formula;

$$V_{PQ} = I_C \cdot R_{28} + V_{BE},$$

where $R_{28}$ is the resistance of the resistor 28.

When the voltage $V_{PQ}$ across the zener diode is lower than the zener voltage $V_Z$, an electric current does not flow through the zener diode 25. Therefore, in this case, the circuit as shown in FIG. 2 works as if it did not have the zener diode 25. The voltage $V_{PQ}$ increases as the current $I_C$ increases (as the impedance of the load 12 decreases).

Then, when the voltage $V_{PQ}$ reaches up to the zener voltage $V_Z$ of the zener diode 25, the zener diode 25 works as shown in FIG. 2, and consequently, the voltage $V_{PQ}$ across the zener diode does not rise over the zener voltage $V_Z$.

Since the voltage $V_{PQ}$ is held at the zener voltage $V_Z$, the base current $I_B$ of the transistor 20 is held at a constant level, and accordingly the collector current $I_C$ of the transistor 20 (load current) is also held at a constant level. Hence, even if the impedance of the load 12 is lowered and a rush current is bound to flow, the circuit will so act that a current over a predetermined level will not flow through the transistor 20. Thus, the circuit functions as a current limiter which does not flow a current of over a predetermined level. The predetermined level of the current $I_C$, that is the limited current value, $I_{CC}$, is represented by $$I_{CC} = (V_Z - V_{PQ})/R_{28}.$$

The limited current value $I_{CC}$ can, therefore, be set by selecting the zener voltage $V_Z$ or the emitter resistor $R_{28}$.

The current flowing through the zener diode is about several times as large as the base current $I_B$ at most and is much lower than the limited current value $I_{CC}$, and accordingly is negligible.

Then, when the impedance of the load 12 increases and the load current $I_C$ decreases down to below the limited current value $I_{CC}$, the voltage $V_{PQ}$ falls below the zener voltage $V_Z$ and the zener diode 25 becomes not flow any current again. Thus, the circuit again functions as if it did not have the zener diode 25, and the base current $I_B$ decreases as the load current $I_C$ decreases.

Thus, the current limiter 10 as described above referring to FIG. 2 functions to allow an electric current to flow therethrough changing its level according to the variation in impedance of the load when the level thereof is below the limited current value $I_{CC}$. When the level thereof reaches up to the limited current value $I_{CC}$ as the impedance of the load decreases, the current limiter 10 functions not to allow the flow of electric current of the level above the limited current value $I_{CC}$.

Figure 3A:
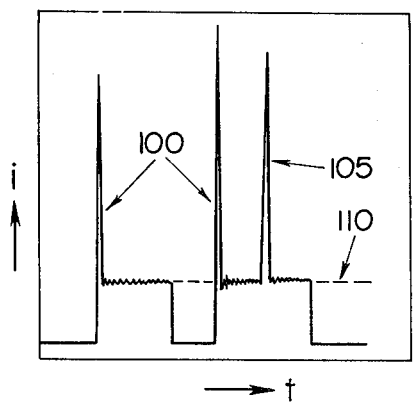
FIG. 3A is a graphical representation showing the rush current flowing in the servo amplifier in the prior art.

The operation of the servo amplifier including the current limiter 10 as constructed above will now be described in detail with reference to FIGS. 3A and 3B which shows the level of the current flowing at the plus power output of the power amplifier 9. When a video signal for instance is given at the control signal input terminal 8 from a camera, the signal is amplified by the pre-amplifier 7 with respect to a standard level and converted to a minus output or a plus output. Further, the power is amplified through the power amplifier 9 and the servomotor 11 is rotated in the forward or rearward direction, by which an iris control means of a lens is controlled to control a video signal output at a constant level. The current supplied to the power amplifier 9 according to the change in the video signal changes as shown in FIG. 3A in the conventional servo amplifier which does not use a current limiter, in which rush currents shown at 100 and 105 in FIG. 3A are generated when the servomotor 11 is started or the motor is inverted. The rush currents 100 and 105 having a level of 5 to 6 times as high as the normal current cause instantaneous voltage drops in the camera circuit of the camera loaded with a small power source, which markedly affect the operation of the video circuit or the like in the camera.

Figure 3B:
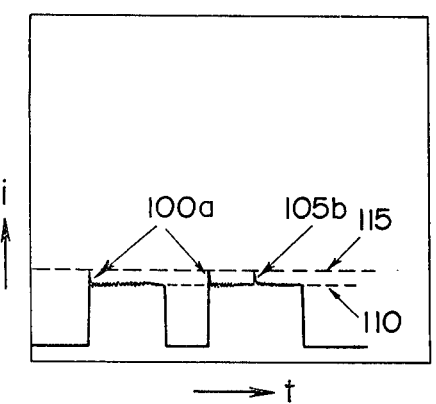
FIG. 3B is a graphical representation showing the improved current flowing through the servo amplifier in accordance with the present invention.

In the servo amplifier in accordance with the present invention which employs the current limiters 10a and 10b, the rush currents are limited to the level indicated at 115 corresponding to said limited current value $I_{CC}$ by the current limiters 10a and 10b as shown at 100a and 105a in FIG. 3B. The limited level 115 is determined to be slightly higher than the normal current level of the normal operation of the power amplifier 9. Therefore, the rush current is limited of its peak level by the level 115 limited by the current limiters 10a and 10b, whereby the voltage drop of the source voltage is prevented, and the video circuit can be controlled in the normal operation state thereof.

Now other embodiments of the circuit in accordance with the present invention will be described with reference to FIGS. 4 to 6.

Figure 4:
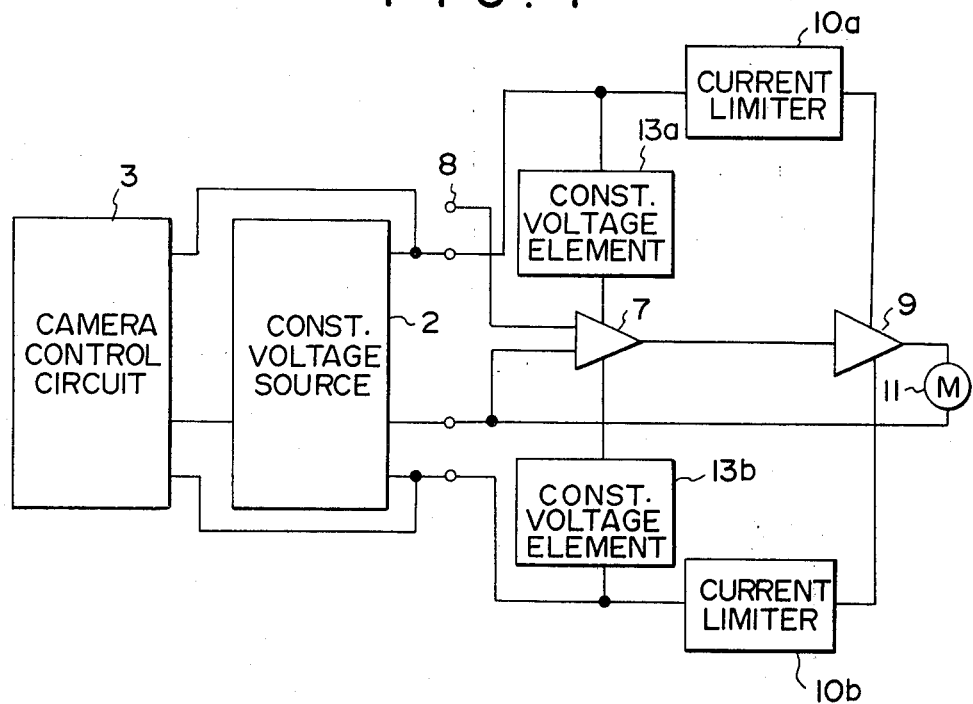
FIGS. 4, 5 and 6 are circuit views of the servo amplifiers in accordance with other embodiments of the present invention.

FIG. 4 shows a modification of the circuit shown in FIG. 1 in which constant voltage elements 13a and 13b are inserted between the pre-amplifier 7 and the current limiters 10a and 10b respectively so that the voltage at the supply terminal of the pre-amplifier 7 is lower than the voltage at the supply terminal of the power amplifier 9. The operation of the circuit shown in FIG. 4 is the same as that of the circuit shown in FIG. 1, and accordingly the description thereof is omitted here.

Figure 5:
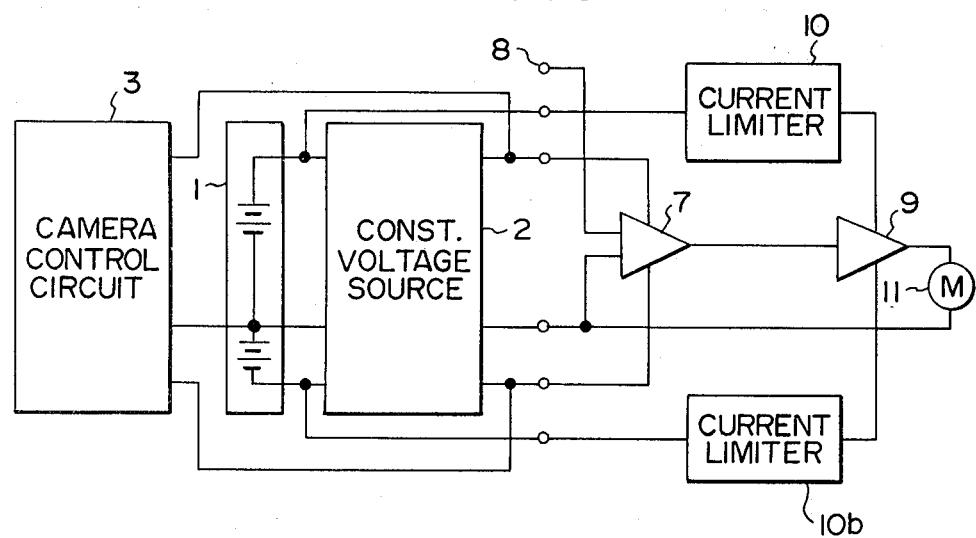

FIG. 5 shows a further modification of the circuit shown in FIG. 1 in which the power amplifier 9 is supplied with a power directly from a source 1. The modification is made because the power amplifier 9 should not always be supplied with a power from the constant voltage source 2 and consumes a large amount of power. The power amplifier 9 is used for amplifying power and accordingly is not so affected by the fluctuation in the supplied voltage, which is the reason why the power amplifier 9 should not always be supplied with the power from the constant voltage source 2. Since the operation of the circuit shown in FIG. 5 is the same as that of the circuit shown in FIG. 1, the description thereof is omitted.

The above described embodiments of the invention are used for controlling the automatic iris in a television camera. However, in the servo circuit used for controlling a zooming means or a focusing means also, the similar circuit can be employed for the same purpose. Further, when a plurality of servo circuits of these kinds are employed at the same time, the similar circuit construction can be employed for the same purpose. One of the example of this kind will be described hereinbelow with reference to FIG. 6.

Figure 6:
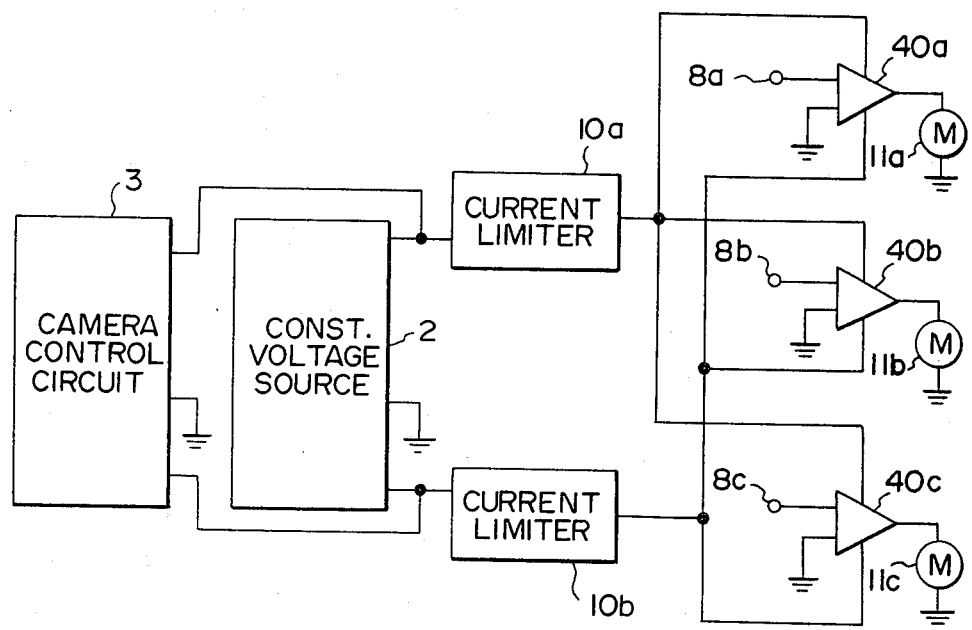

Referring to FIG. 6, a plurality of servo amplifiers in a television camera lens are supplied with a current by way of a single set of current limiters 10a and 10b. A servomotor for zooming 11a, a servomotor for focusing 11b and a servomotor for automatic iris control 11c are driven by servo amplifiers 40a, 40b and 40c, respectively, which function as said pre-amplifiers 7 and power amplifiers 9 at the same time. The operation of the servo amplifiers 40a, 40b and 40c is to amplify the input signals from the control signal input terminals 8a, 8b and 8c and drive the servomotors 11a, 11b and 11c by the amplified signals. When a rush current is generated, it is controlled to the limited level by the current limiters 10a and 10b in whichever amplifier it may be generated.

We claim:

1. A servo amplifier for driving a servomotor in a television camera, said amplifier comprising, in combination, a camera control circuit, a constant voltage source, a current limiter, and a power amplifier, said current limiter comprising in combination, a transistor and zener diode, and means for causing said zener diode to become non-conductive and causing a current to flow only through the transistor in a first mode when the drive current required by said servomotor is relatively low, and for causing said zener diode to become conductive and causing a current to flow through the zener diode and thereby to cause a current for a predetermined level to flow through said transistor in a second mode when the drive current required by said servomotor is greater than a predetermined value.

2. A servo amplifier as defined in claim 1 wherein said current limiter comprises a transistor connected with said constant voltage source, an emitter resistor connected between the emitter of the transistor and the power amplifier, a bias resistor connected between the base and the collector of the transistor, and a zener diode connected between the base side end of the base resistor and the power amplifier side end of the emitter resistor, whereby the voltage across the zener diode equal to the sum of the base emitter voltage of the transistor and the voltage drop at the emitter resistor corresponding to the product of the electric current flowing through the emitter resistor and the resistance of the emitter resistor is held to be not more than a predetermined voltage corresponding to the zener voltage of the zener diode.

* * * * *